United States Patent
Okazaki et al.

(10) Patent No.: US 11,467,111 B2
(45) Date of Patent: Oct. 11, 2022

(54) CRACK DETECTION DEVICE

(71) Applicant: OKAZAKI MANUFACTURING COMPANY, Kobe (JP)

(72) Inventors: Kazuhide Okazaki, Kobe (JP); Masaru Yamana, Kobe (JP); Hideo Obi, Kobe (JP)

(73) Assignee: OKAZAKI MANUFACTURING COMPANY, Kobe (JP)

( * ) Notice: Subject to any disclaimer, the term of this patent is extended or adjusted under 35 U.S.C. 154(b) by 15 days.

(21) Appl. No.: 17/241,756

(22) Filed: Apr. 27, 2021

(65) Prior Publication Data
US 2022/0146446 A1 May 12, 2022

Related U.S. Application Data

(63) Continuation of application No. PCT/JP2020/041568, filed on Nov. 6, 2020.

(51) Int. Cl.
*G01N 27/20* (2006.01)
*G01M 5/00* (2006.01)
*H01B 3/02* (2006.01)

(52) U.S. Cl.
CPC ............. *G01N 27/20* (2013.01); *H01B 3/02* (2013.01)

(58) Field of Classification Search
CPC .................... G01N 27/20; H01B 3/02
See application file for complete search history.

(56) References Cited

U.S. PATENT DOCUMENTS

| | | | |
|---|---|---|---|
| 4,145,915 A * | 3/1979 | Oertle | G01M 3/26 73/37 |
| 5,355,734 A | 10/1994 | Kajino | |
| 5,969,260 A | 10/1999 | Belk et al. | |
| 6,476,624 B1 * | 11/2002 | Chuman | G01N 27/20 324/522 |
| 9,970,841 B2 * | 5/2018 | Taillade | G01R 31/11 |

(Continued)

FOREIGN PATENT DOCUMENTS

| JP | H03-218451 A | 9/1991 |
|---|---|---|
| JP | H04-50634 A | 2/1992 |
| JP | 2005-091167 A | 4/2005 |

(Continued)

OTHER PUBLICATIONS

Dec. 22, 2020 Search Report issued in International Patent Application No. PCT/JP2020/041568.

*Primary Examiner* — Feba Pothen
(74) *Attorney, Agent, or Firm* — Oliff PLC

(57) ABSTRACT

A crack detection device for detecting a crack that occurs in a structure, includes: an MI cable that includes a metal sheath and a conductive wire accommodated in the metal sheath via a mineral insulating powder, and that is disposed along the structure so as to intersect an assumed crack C in a part of the structure where occurrence of a crack is assumed; a joint portion that is made of a metal that forms a joint when solidified from a melting state, and that joins the MI cable to the structure or a member fixed to the structure; and a detection device connected to both ends of a conductive wire, and configured to detect electrical characteristics of the conductive wire. The joint portion is present on one side and the other side with respect to the assumed crack C in a direction intersecting the assumed crack C.

4 Claims, 15 Drawing Sheets

(56) References Cited

U.S. PATENT DOCUMENTS

2005/0075800 A1* 4/2005 Batzinger .............. G01B 7/281
702/35
2010/0225497 A1* 9/2010 Marincak ............... G01N 27/24
340/657

FOREIGN PATENT DOCUMENTS

| JP | 2005-156552 A | 6/2005 | | |
|---|---|---|---|---|
| JP | 2008-175529 A | 7/2008 | | |
| JP | 2009-198428 A | 9/2009 | | |
| JP | 2010-060445 A | 3/2010 | | |
| WO | WO-03036252 A2 * | 5/2003 | ........... | G01L 19/003 |

* cited by examiner

CRACK DETECTION DEVICE

CROSS-REFERENCE TO RELATED APPLICATIONS

The present application is a bypass continuation application claiming priority on international patent application PCT/JP2020/041568 filed on Nov. 6, 2020, the entire content of which is incorporated herein by reference.

BACKGROUND OF THE INVENTION

Field of the Invention

The present disclosure relates to a crack detection device for detecting occurrence of a crack in a structure.

Description of the Related Art

While structures such as bridges and railcar bogies have been subjected to pressure and vibration for a long period of time, the structures may undergo metal fatigue, and the metal fatigue may result in cracks. Such cracks need to be found in an early stage and some measures need to be taken, in view of safety management. However, in visual inspection that depends on ability and attention of an inspector, small cracks are likely to be overlooked. Moreover, a small crack may grow during a period between inspections and cause breakage or the like of a structure. Therefore, various crack detection devices for detecting occurrence and location of any crack in an early stage have been proposed (see PATENT LITERATURE 1, for example).

In a crack detection device disclosed in PATENT LITERATURE 1, a detection wire formed by coating a hard-drawn copper wire is fixed through an adhesive onto a crack-assumed portion on the surface of a bridge. A current is constantly applied from one end of the detection wire toward the other end thereof. In this crack detection device, if a crack occurs in the bridge at the portion where the detection wire is fixed, the detection wire is broken and current application is blocked. Thus, occurrence of the crack can be detected.

CITATION LIST

Patent Literature

Patent Literature 1: Japanese Laid-Open Patent Publication No. 2005-156552

BRIEF SUMMARY OF THE INVENTION

Technical Problem

In PATENT LITERATURE 1, the detection wire used in the crack detection device is a coated copper wire that is formed by coating a hard-drawn copper wire with an insulating material and has a diameter of 0.3 mm or less. When the detection wire is fixed to the surface of a structure, an epoxy or cyanoacrylate-based adhesive is preferably used. However, the adhesive strength of such an adhesive is reduced while the adhesive is subjected to moisture, oil, heat, ultraviolet rays, etc., during a long-term use. If a stress continuously occurs in the adhesive with the reduced adhesive strength, deterioration of the adhesive progresses. As a result, the adhesive becomes incapable of holding the detection wire. The detection wire, which is not reliably held on the structure, cannot detect a crack. Meanwhile, in a railcar bogie, the detection wire may be broken due to flying stones or the like. In this case, such breakage may be mistakenly detected as a crack in the structure.

An object of the present disclosure is to provide a crack detection device capable of inhibiting deterioration of a crack detection function for a long period of time, and detecting occurrence of a crack more reliably.

Solution to Problem

A crack detection device according to this disclosure is a crack detection device configured to detect a crack that occurs in a structure, and the device includes: an MI cable including a metal sheath and a conductive wire accommodated in the metal sheath via a mineral insulating powder, the MI cable being disposed along the structure so as to intersect an assumed crack in a part of the structure where occurrence of a crack is assumed; a joint portion made of a metal that forms a joint when solidified from a melting state, the joint portion joining the MI cable to the structure or a member fixed to the structure; and a detection device connected to both ends of a conductive wire, and configured to detect electrical characteristics of the conductive wire. The joint portion is present on one side and the other side with respect to the assumed crack in a direction intersecting the assumed crack.

Advantageous Effects of Disclosure

According to the crack detection device of the present disclosure, deterioration of the crack detection function can be inhibited for a long period of time, and occurrence of a crack can be detected more reliably.

DETAILED DESCRIPTION OF THE INVENTION

Hereinafter, embodiments of the present disclosure will be described with reference to the drawings. It should be noted that FIG. 1 to FIG. 15 (excluding FIG. 5 and FIG. 13) are drawn mainly for the purpose of showing the features of the structures, and therefore, the dimension of each part is not necessarily proportional to the actual dimension of the part.

First Embodiment

Figure 1:
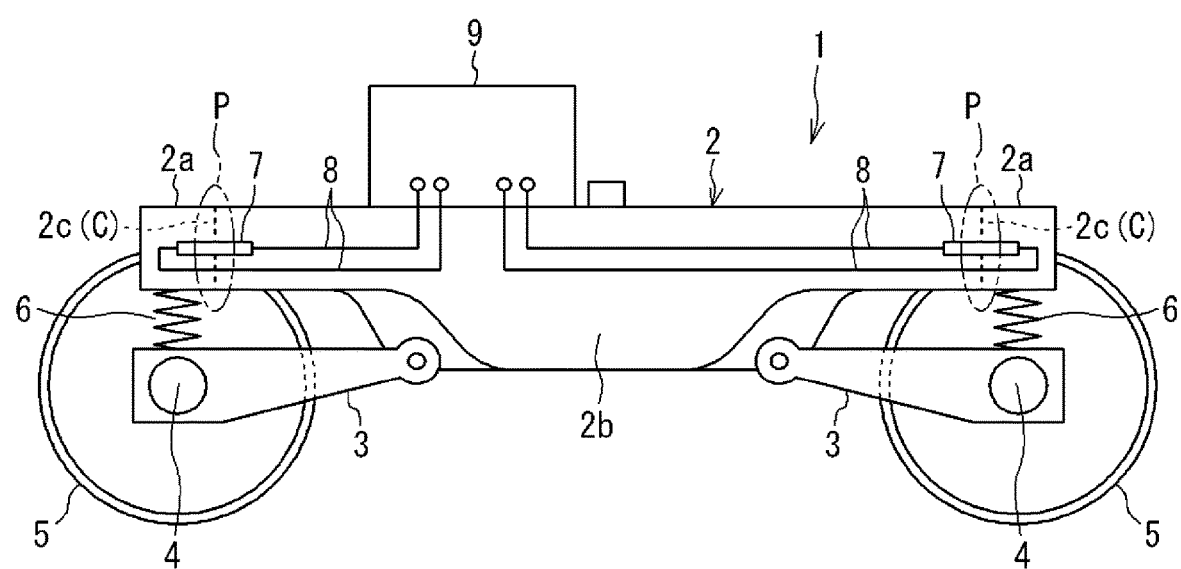
FIG. 1 schematically shows an example of a railcar bogie, as viewed from one side in a railcar width direction orthogonal to a bogie advancing direction.

FIG. 1 schematically shows an example of a railcar bogie that is made of a metal such as steel or aluminum, as viewed from one side in the railcar width direction orthogonal to the bogie advancing direction. When the bogie is viewed from the other side, FIG. 1 is front-back inverted. The bogie 1 includes a bogie frame 2, support arms 3, axles 4, wheels 5, and axle springs 6. Each support arm 3 is pivotable with respect to the bogie frame 2. An axle 4 is mounted on a front end side of a support arm 3. One bogie 1 includes four sets of support arms 3, wheels 5, and axle springs 6. A pair of left and right wheels 5 in the railcar width direction are connected to each other by an axle 4. An axle spring 6 is disposed between a front end of a support arm 3 and a spring seat 2a at a front end of the bogie frame 2.

The spring seat 2a to which an upper end of the axle spring 6 is fixed is formed integrally with a main body 2b of the bogie frame 2 by welding. A weld bead 2c remains in the welded portion. Generally, when an external force acts on a structure, a component of the structure tends to deform due to the force. Then, a force generated inside the component against the deformation is a stress.

Near a joint between the main body 2b of the bogie frame 2 and the spring seat 2a, a strong stress occurs due to the weight of the railcar and an impact from the railroad. In addition, a stress tends to concentrate on a portion the shape of which discontinuously changes, such as fine flaws, grooves, or irregularities at the surface of the component. Therefore, a stress tends to concentrate on the weld bead 2c and its vicinity, and a crack may occur due to long-term use.

A crack-assumed portion P shown in FIG. 1 is a portion where a crack is likely to occur due to concentration of stress. Therefore, if a crack occurs in this portion, this crack needs to be immediately detected. In the crack-assumed portion P of the bogie 1, a crack occurs in the vertical direction. Therefore, the following description will be made with a line along the weld bead 2c being an "assumed crack C" that is assumed to occur in the crack-assumed portion P.

An MI (Mineral Insulated) cable 7 is disposed along the surface of the bogie frame 2 so as to be horizontally long and intersect the assumed crack C. This MI cable 7 is formed by accommodating a conductive wire in a metal sheath with a mineral insulating powder intervening between them. The MI cable 7 is a cable, for a signal, through which a minute current is allowed to flow. To the both ends of the MI cable 7, one ends of two external cables 8 are respectively connected. The other ends of the external cables 8 are connected to a detection device 9.

Figure 2:
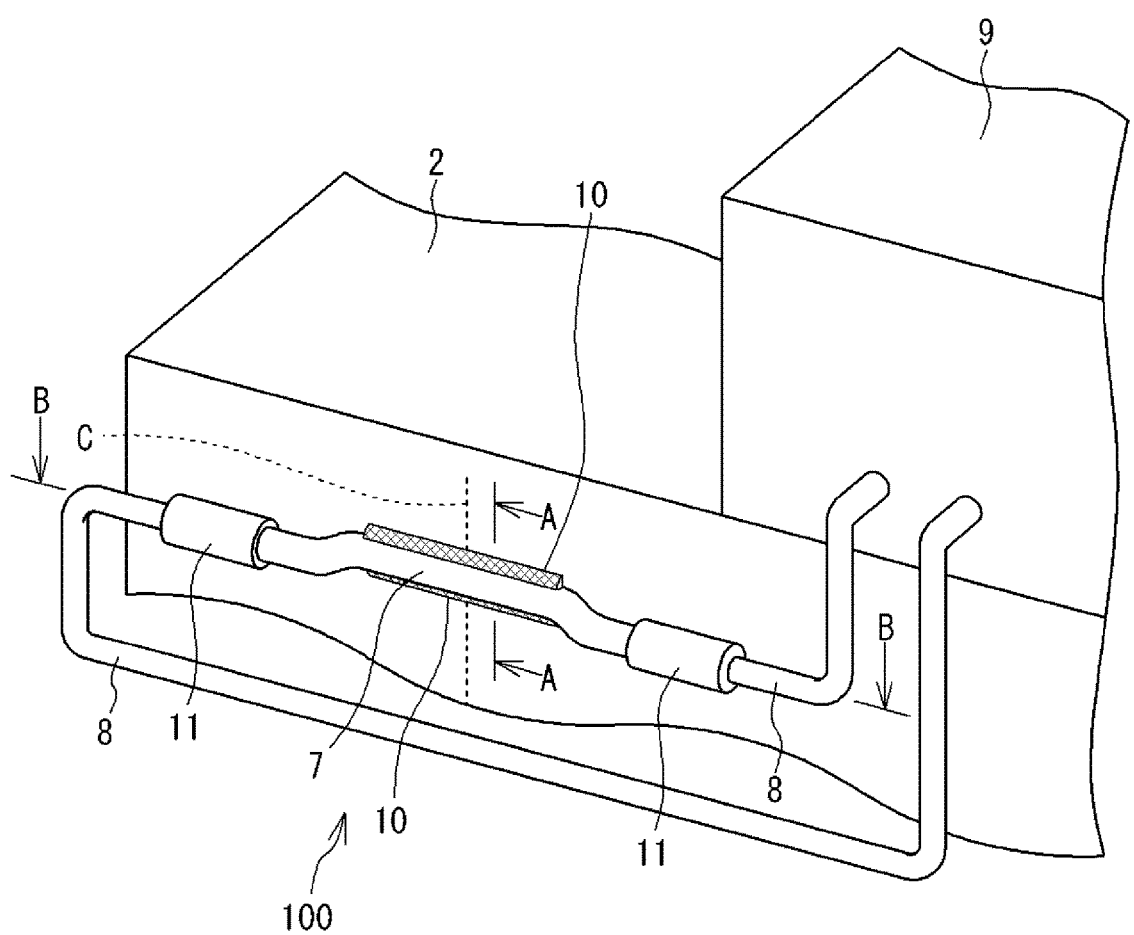
FIG. 2 is an enlarged perspective view around an MI cable which is a component of a crack detection device according to a first embodiment.

FIG. 2 is an enlarged perspective view around the MI cable 7 which is a component of a crack detection device 100 according to a first embodiment. While FIG. 2 shows the MI cable 7 and its vicinity on the left side in FIG. 1, the MI cable 7 and its vicinity on the right side in FIG. 1 are similar to FIG. 2 because these MI cables are left-right symmetrical.

In FIG. 2, the MI cable 7 intersects the assumed crack C. The MI cable 7 is, at an intermediate portion thereof excluding the both ends, fixed to the surface of the bogie frame 2 via a joint portion 10 formed by laser welding, for example. The laser-welded joint portion 10 is formed across the assumed crack C and continuously around the center of the MI cable 7 in the direction (axial direction) in which the MI cable 7 extends. Therefore, the joint portion 10 is present on one side and the other side, with respect to the assumed crack C, in the direction intersecting the assumed crack C. The joint portion 10 is a metal joint formed through solidification from the melting state, such as welding or brazing, and therefore is robust.

Metal sleeves 11 are mounted to the both ends of the MI cable 7. The insulation-coated external cables 8 drawn out from the metal sleeves 11 are connected to the detection device 9. Instead of the external cables 8, a conduit tube through which a coated wire is passed may be adopted.

The joint portion 10 that is formed continuously along the MI cable 7 as shown in FIG. 2 is merely an example, and the present disclosure is not limited thereto. For example, laser welding may be discontinuously performed on a plurality of spots. However, the MI cable 7 needs to be reliably metal-joined to the surface of the bogie frame 2, on at least one spot on each of the one side and the other side with respect to the assumed crack C in the direction intersecting the assumed crack C.

Figure 3:
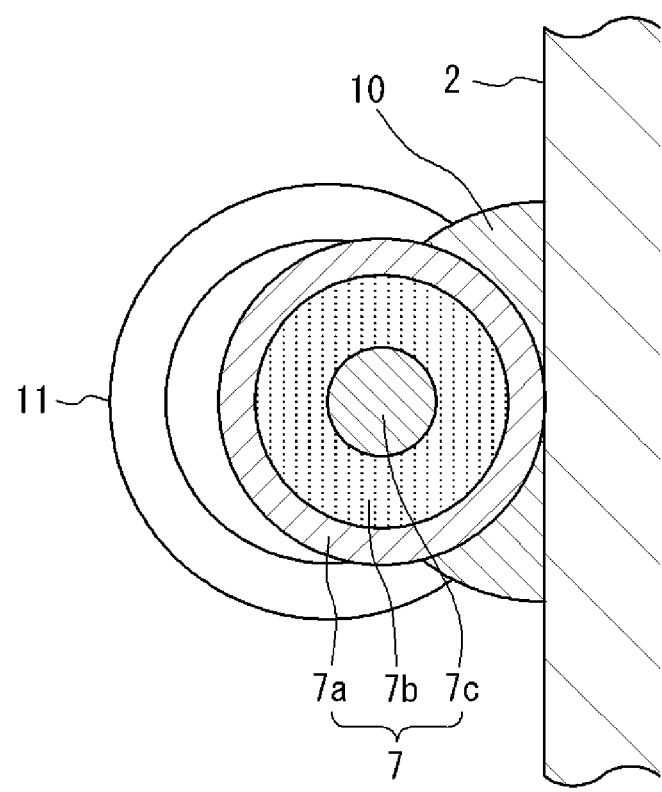
FIG. 3 is a cross-sectional view corresponding to a part viewed in the direction of arrows A-A in FIG. 2.

FIG. 3 is a cross-sectional view corresponding to a part viewed in the direction of arrows A-A in FIG. 2. The MI cable 7 includes an outer metal sheath 7a, a mineral insulating powder 7b firmly packed in the metal sheath 7a at high density, and a single conductive wire 7c in the center. The joint portion 10 is a metal joint formed such that the surface of the bogie frame 2 and the metal sheath 7a are integrated with each other.

The metal sheath 7a is made of austenite-based stainless steel, and has an outer diameter of 3.0 mm and a thickness of 0.3 mm. The conductive wire 7c is a nickel wire, and has an outer diameter of 0.7 mm. The austenite-based stainless steel is an alloy steel containing chromium and nickel, has high corrosion resistance, requires no rust prevention treatment, and is robust. The austenite-based stainless steel is an easily available material because more than half the stainless steels on the market are the austenite-based stainless steel. The materials and dimensions described above are merely examples, and the present disclosure is not limited thereto. For example, the outer diameter of the metal sheath 7a is preferably 1.0 mm or greater and 3.0 mm or smaller. When the outer diameter is smaller than 1.0 mm, the metal sheath 7a is difficult to handle. When the outer diameter exceeds 3.0 mm, reliability of breakage in response to a crack is reduced by a little.

Laser welding has less heat input and therefore is less affected by heat as compared to other welding methods such as arc welding. When laser welding is adopted, influence of heat on the metal sheath 7a can be minimized, thereby inhibiting thermal influence on the conductive wire 7c.

Thus, it is possible to inhibit the MI cable 7 from being damaged when the MI cable 7 is fixed to the bogie frame 2.

Instead of laser welding, brazing may be adopted. Brazing also forms a metal joint through solidification from a melting state, and therefore, the resultant metal joint is robust.

As described above, the MI cable 7 has the outer sheath made of a metal (metal sheath 7a), and therefore can be fixed integrally with the bogie frame 2 through laser welding. Thus, the MI cable 7 is robust, is stable with respect to the surrounding environment, and is highly resistant to moisture, oil, heat, ultraviolet rays, etc. Moreover, since the MI cable 7 is integrated with the bogie frame 2, once a crack has occurred in the bogie frame 2, the MI cable 7 sensitively responds to the crack and is broken.

Figure 4:
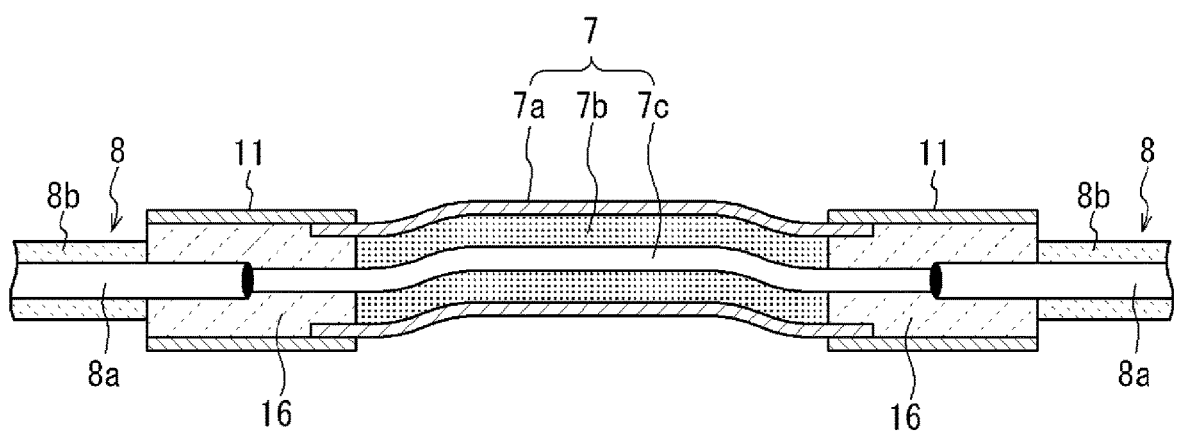
FIG. 4 is a cross-sectional view corresponding to a part viewed in the direction of arrows B-B in FIG. 2.

FIG. 4 is a cross-sectional view corresponding to a part viewed in the direction of arrows B-B in FIG. 2. At the both ends of the MI cable 7, the metal sheath 7a is joined to inner peripheral surfaces of the metal sleeves 11. The conductive wire 7c is connected to conductive wires 8a of the external cables 8 with insulating coatings 8b. The inside of each metal sleeve 11 is filled with a sealant 16 of an insulating material (e.g., glass). With the sealant 16, a portion of the conductive wire 7c connected to the conductive wire 8a of the external cable 8 is fixed and protected so as not to be broken.

Figure 5:
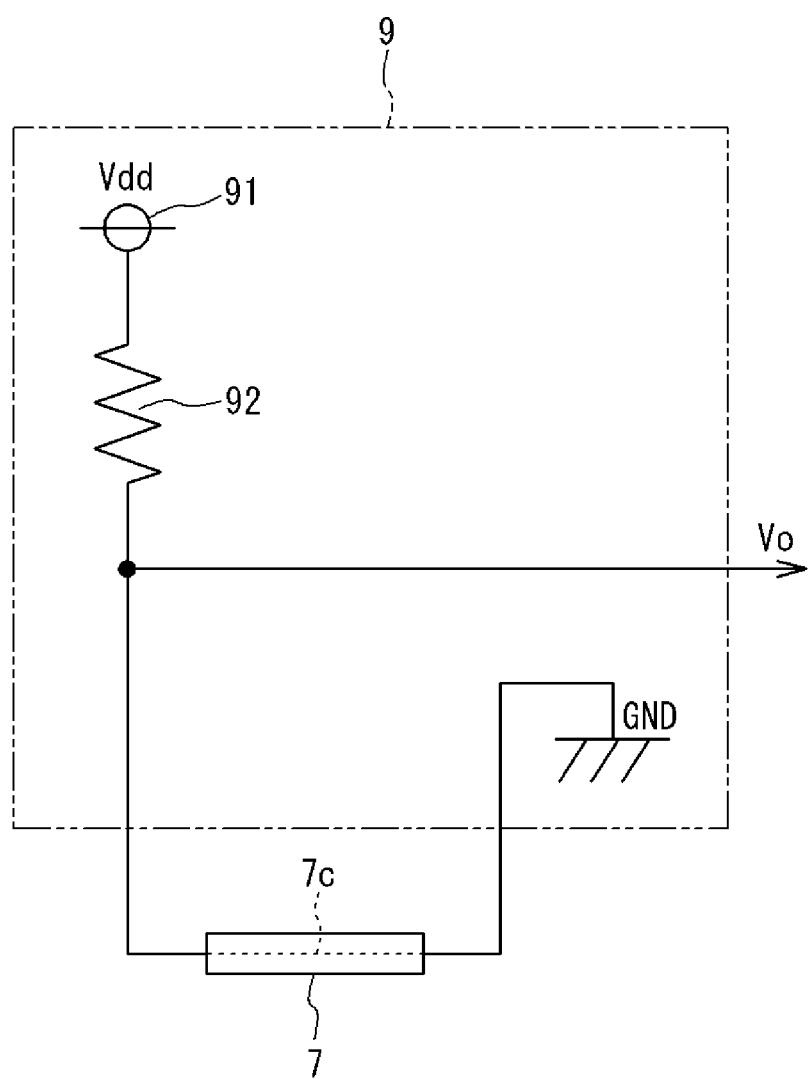
FIG. 5 shows an example of an internal circuit of the detection device.

FIG. 5 shows an example of an internal circuit of the detection device 9. One end of a resistor 92 for limiting a current is connected to a power supply circuit 91 for a DC voltage (Vdd) externally supplied into the detection device 9. The other end of the resistor 92 is connected to one end of the MI cable 7. The other end of the MI cable 7 is grounded (GND) in the detection device 9. A voltage at a connection point between the resistor 92 and the MI cable 7 is outputted as a signal voltage Vo. A current is constantly applied to the MI cable 7 from the power supply circuit 91. The presence of the resistor 92 allows a current value to be limited to a minute value.

While a current is constantly applied to the conductive wire 7c of the MI cable 7 and the conductive wire 7c is normally conductive, the signal voltage Vo is a ground voltage, i.e., 0[V]. When the conductive wire 7c of the MI cable 7 is broken and becomes nonconductive, the signal voltage Vo is Vdd. Therefore, whether the conductive wire 7c of the MI cable 7 is conductive or nonconductive can be known from the signal voltage Vo.

In the detection device 9, for example, a switch that is periodically opened and closed may be inserted between the power supply circuit 91 and the resistor 92 to attempt periodical current application to the conductive wire 7c. The periodical current application realizes power saving as compared to normal current application. In the case where a current is periodically applied to the conductive wire 7c of the MI cable 7, the signal voltage Vo is always 0[V] when the conductive wire 7c is normally conductive. However, if the conductive wire 7c is broken, the signal voltage Vo is a pulse train of Vdd when a current is applied while it is a pulse train of 0[V] when no current is applied. Thus, whether the conductive wire 7c of the MI cable 7 is conductive or non-conductive can be known (the same applies hereinafter).

Referring back to FIG. 2, as described above, the MI cable 7 is mounted to the surface of the bogie frame 2 so as to intersect the assumed crack C. Preferably, the angle of intersection is substantially a right angle. When the MI cable 7 is mounted as described above, the direction (axial direction) in which the MI cable 7 extends becomes substantially the same as the direction in which a crack tip diverges and expands as a crack grows. Therefore, the above mounting manner allows a crack to be detected with high sensitivity. Moreover, since the MI cable 7 is metal-joined integrally with the surface of the bogie frame 2 through laser welding, if a crack occurs in the bogie frame 2, the joint portion 10 is also broken and thereby the MI cable 7 is broken.

Figure 6:
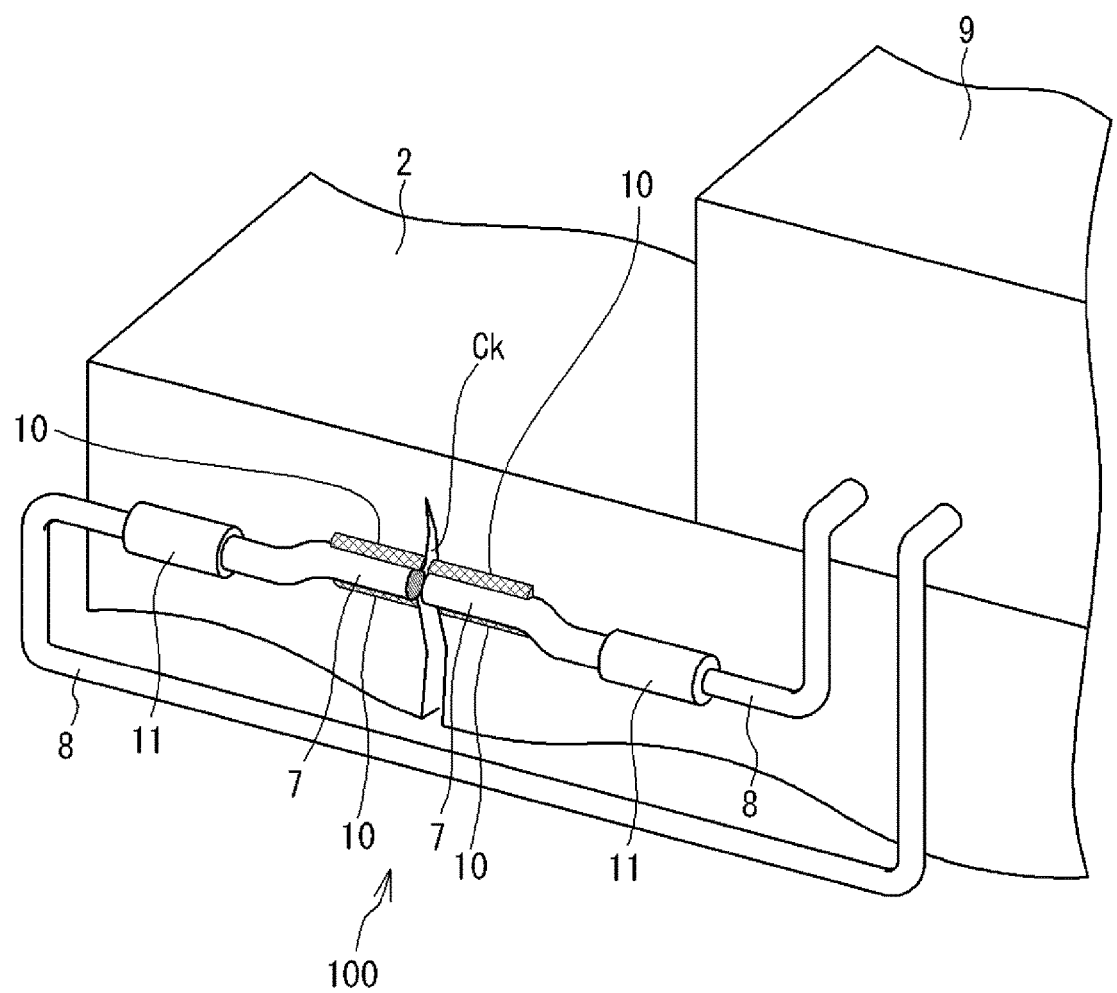
FIG. 6 is a perspective view in a state where a crack occurs in a bogie frame from the state shown in FIG. 2.

FIG. 6 is a perspective view showing a case where a crack Ck occurs in the bogie frame from the state shown in FIG. 2. When a crack occurs near the assumed crack C (FIG. 2), the metal sheath 7a and the conductive wire 7c of the MI cable 7 (FIG. 3, FIG. 4) are pulled and broken in response to the crack. The mineral insulating powder 7b, which is firmly packed in the metal sheath 7a at high density, is pulverized with the breakage of the metal sheath 7a and the conductive wire 7c. The breakage of the conductive wire 7c causes the signal voltage Vo outputted from the detection device 9 to change from 0 to Vdd. Thus, it is possible to quickly detect that no current is applied to the MI cable 7, in other words, that the crack has occurred in the bogie frame 2.

Second Embodiment

Figure 7:
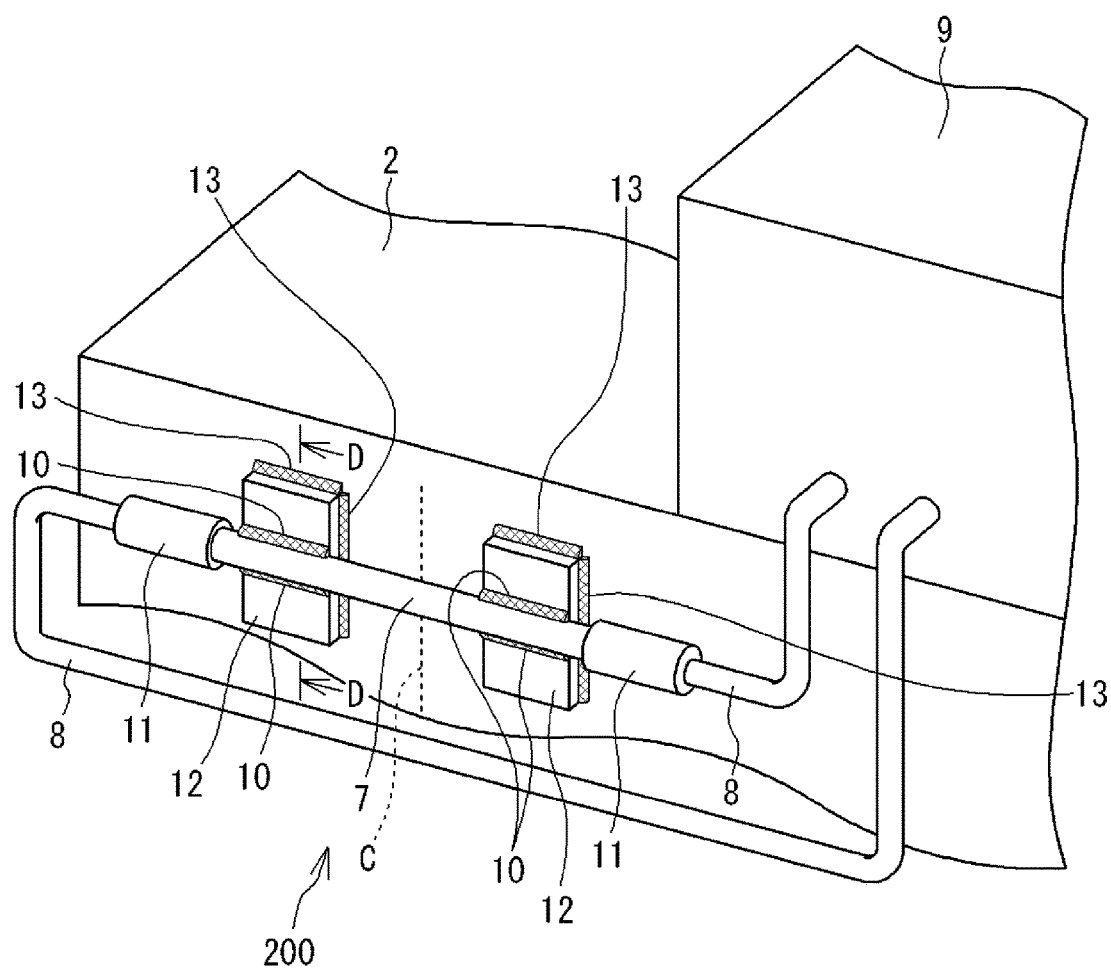
FIG. 7 is an enlarged perspective view around an MI cable which is a component of a crack detection device according to a second embodiment.

FIG. 7 is an enlarged perspective view around an MI cable 7 which is a component of a crack detection device 200 according to a second embodiment. This second embodiment is different from the first embodiment shown in FIG. 2 in that the MI cable 7 is mounted to the bogie frame 2 by laser welding not directly but through metal pads 12 attached to the bogie frame 2.

In FIG. 7, as in the first embodiment, the MI cable 7 intersects the assumed crack C. A pair of metal pads 12 is fixed to the surface of the bogie frame 2 through welded portions 13 formed by arc welding, for example. The two metal pads 12 are present on both sides with respect to the assumed crack C in the direction intersecting the assumed crack C. The MI cable 7 is linearly extended, and is laser-welded on the surfaces of the pair of metal pads 12, continuously in its extending direction (axis direction). Thus, joint portions 10 are formed. The other components of this embodiment are identical to those shown in FIG. 2.

The joint portion 10 that is continuously formed is merely an example, and the present disclosure is not limited thereto. For example, laser welding may be discontinuously performed on a plurality of spots.

Figure 8:
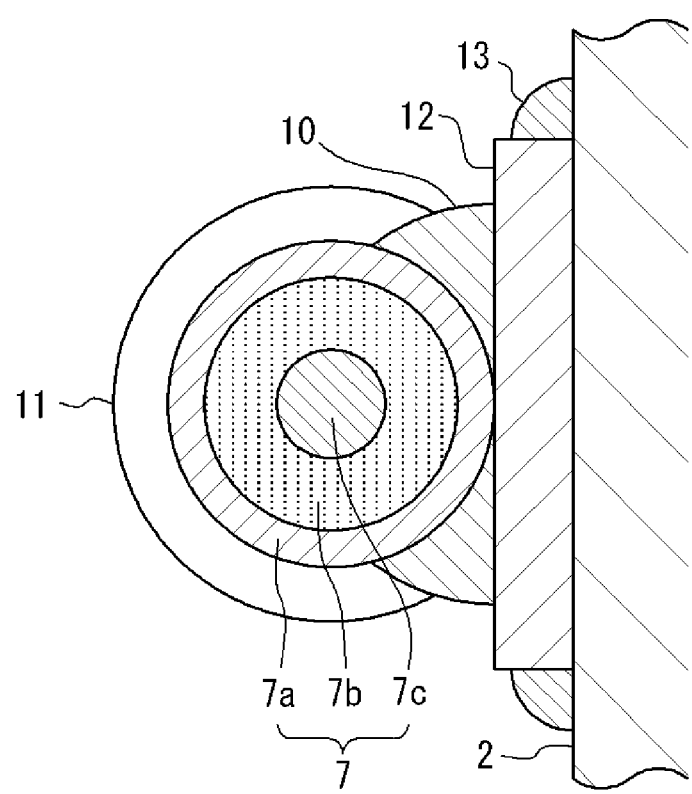
FIG. 8 is a cross-sectional view corresponding to a part viewed in the direction of arrows D-D in FIG. 7.

FIG. 8 is a cross-sectional view corresponding to a part viewed in the direction of arrows D-D in FIG. 7. As in the first embodiment, the MI cable 7 includes an outer metal sheath 7a, a mineral insulating powder 7b firmly packed in the metal sheath 7a at high density, and a single conductive wire 7c in the center. The joint portion 10 forms a metal joint such that the surface of the metal pad 12 and the metal sheath 7a are integrated with each other. The material and the dimensions of the MI cable 7 are the same as those of the first embodiment.

The MI cable 7 has the outer sheath made of a metal (metal sheath 7a), and therefore can be fixed integrally with the metal pad 12 through laser welding. Thus, the MI cable 7 is robust, is stable with respect to the surrounding environment, and is highly resistant to moisture, oil, heat, ultraviolet rays, etc.

Referring back to FIG. 7, as described above, the MI cable 7 is mounted to the surface of the bogie frame 2 so as to intersect the assumed crack C. Preferably, the angle of intersection is substantially a right angle. When the MI cable 7 is mounted as described above, the direction (axial direction) in which the MI cable 7 extends becomes substantially the same as the direction in which a crack tip diverges and expands as a crack grows and the expansion of the crack causes relative displacement between the two metal pads 12 to be maximized. That is, once a crack occurs in the bogie frame 2, a crack tip diverges and expands in the bogie frame 2, and the expansion of the crack is reflected, as it is, as an increase in the distance between the two metal pads 12. As a result, the MI cable 7 is broken, and the conductive wire 7c is also broken. Thus, as in the first embodiment, the crack can be detected with high sensitivity.

Figure 9:
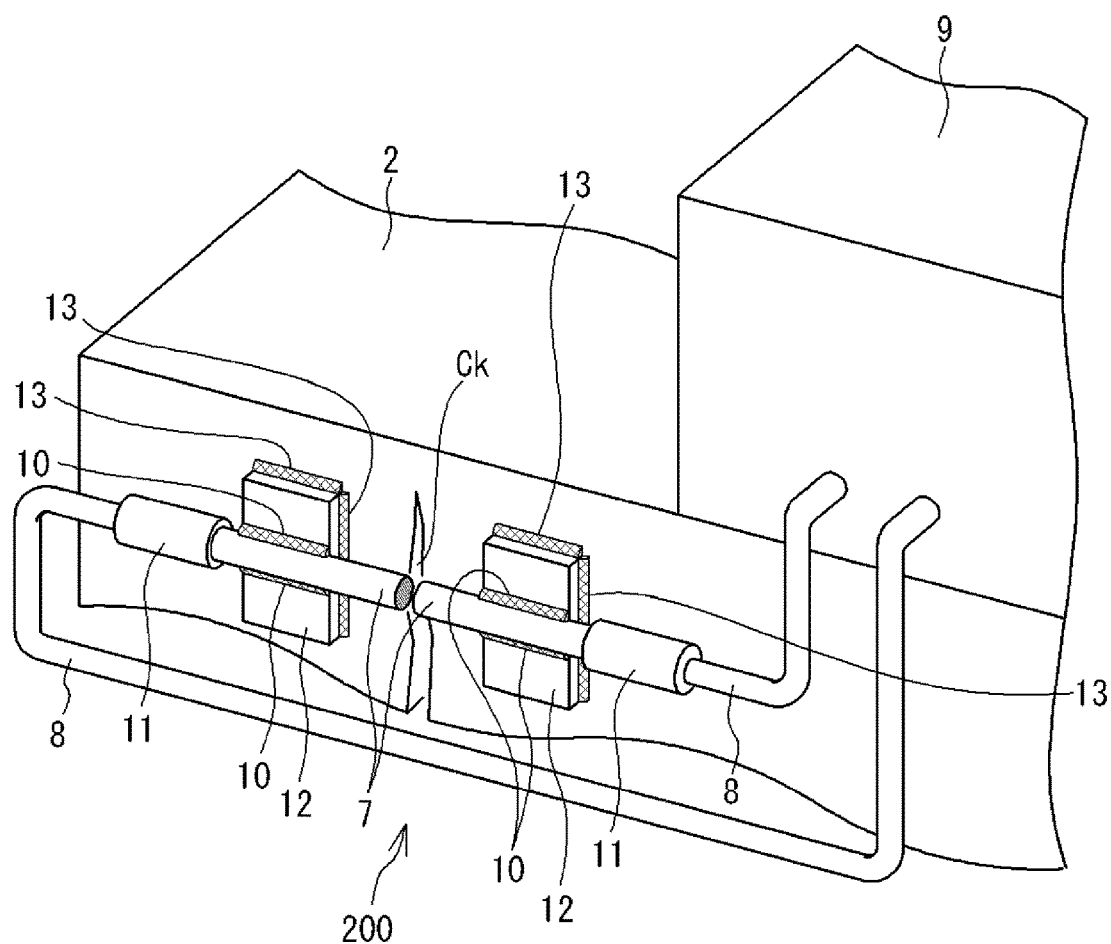
FIG. 9 is a perspective view in a case where a crack occurs in a bogie frame from the state shown in FIG. 7.

FIG. 9 is a perspective view showing a case where a crack Ck occurs in the bogie frame 2 from the state shown in FIG. 7. When a crack occurs near the assumed crack C (FIG. 7), the metal sheath 7a and the conductive wire 7c of the MI cable 7 (FIG. 8) are pulled and broken in response to the crack. The breakage of the conductive wire 7c causes the signal voltage Vo outputted from the detection device 9 (FIG. 5) to change from 0 to Vdd. Thus, it is possible to quickly detect that no current is applied to the MI cable 7, in other words, that the crack has occurred in the bogie frame 2.

According to the configuration of the second embodiment, thermal influence on the MI cable 7 can be inhibited by using laser welding for welding the metal sheath 7a of the MI cable 7 to the metal pads 12. Moreover, since welding between the metal pads 12 and the surface of the bogie frame 2 is not direct welding to the MI cable 7, thermal influence is inhibited. Therefore, not only laser welding but also arc welding can be adopted.

Thus, separately from welding between the metal pads 12 and the surface of the bogie frame 2, welding between the metal sheath 7a of the MI cable 7 and the metal pads 12 may be performed in advance. That is, the welding processes can be separately performed, which is advantageous from the viewpoint of mounting work because the latter welding process that requires closer attention as compared to the former welding process can be performed in advance.

While two metal pads 12 are used in the second embodiment, three or more metal pads may be used. However, the MI cable 7 needs to be reliably metal-joined to the surfaces of the metal pads 12 on the both sides with respect to the assumed crack C in the direction intersecting the assumed crack C.

Third Embodiment

Figure 10:
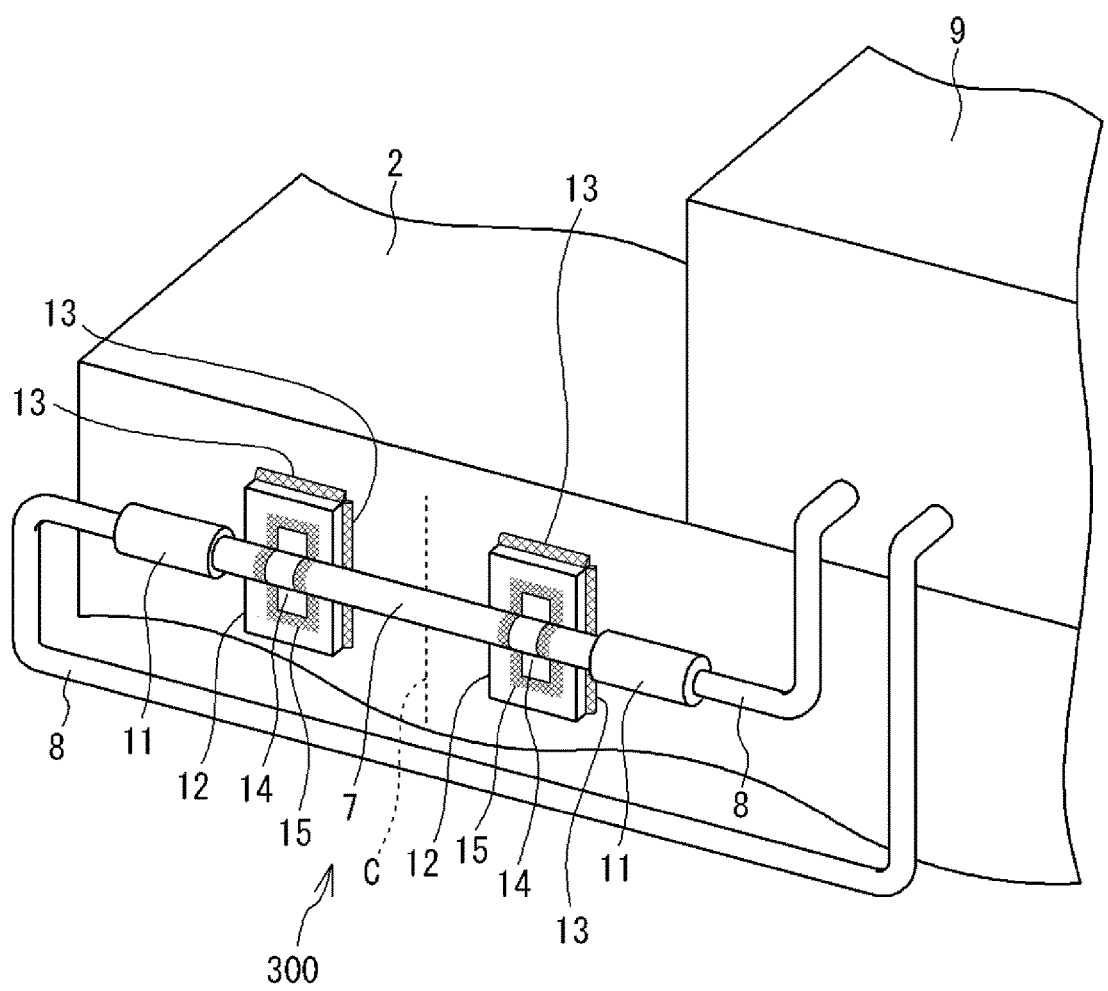
FIG. 10 is an enlarged perspective view around an MI cable which is a component of a crack detection device according to a third embodiment.

FIG. 10 is an enlarged perspective view around an MI cable 7 which is a component of a crack detection device 300 according to a third embodiment. The third embodiment is different from the second embodiment shown in FIG. 7 in the method of fixing the MI cable 7 to the metal pads 12. The other components of the third embodiment are identical to those of the second embodiment. In FIG. 10, the MI cable 7 is fixed to the metal pads 12 by using pressing metal fittings 14 made of a metal. The outer edges of each pressing metal fitting 14 are fixed to the metal pad 12 and the MI cable 7 through a joint portion 15 formed by brazing. In the first and second embodiments, since laser welding is performed on the thin MI cable 7, the welding has some degree of difficulty. Meanwhile, performing brazing on the pressing metal fittings 14 allows the MI cable 7 to be fixed to the metal pads 12 more easily.

As in the case of FIG. 9, in this third embodiment, when a crack occurs near the assumed crack C (FIG. 10), the MI cable 7 is pulled in response to the crack, and the conductive wire 7c is broken. The breakage of the conductive wire 7c causes the signal voltage Vo outputted from the detection device 9 (FIG. 5) to change from 0 to Vdd. Thus, it is possible to quickly detect that no current is applied to the MI cable 7, in other words, that the crack has occurred in the bogie frame 2.

Fourth Embodiment

Figure 11:
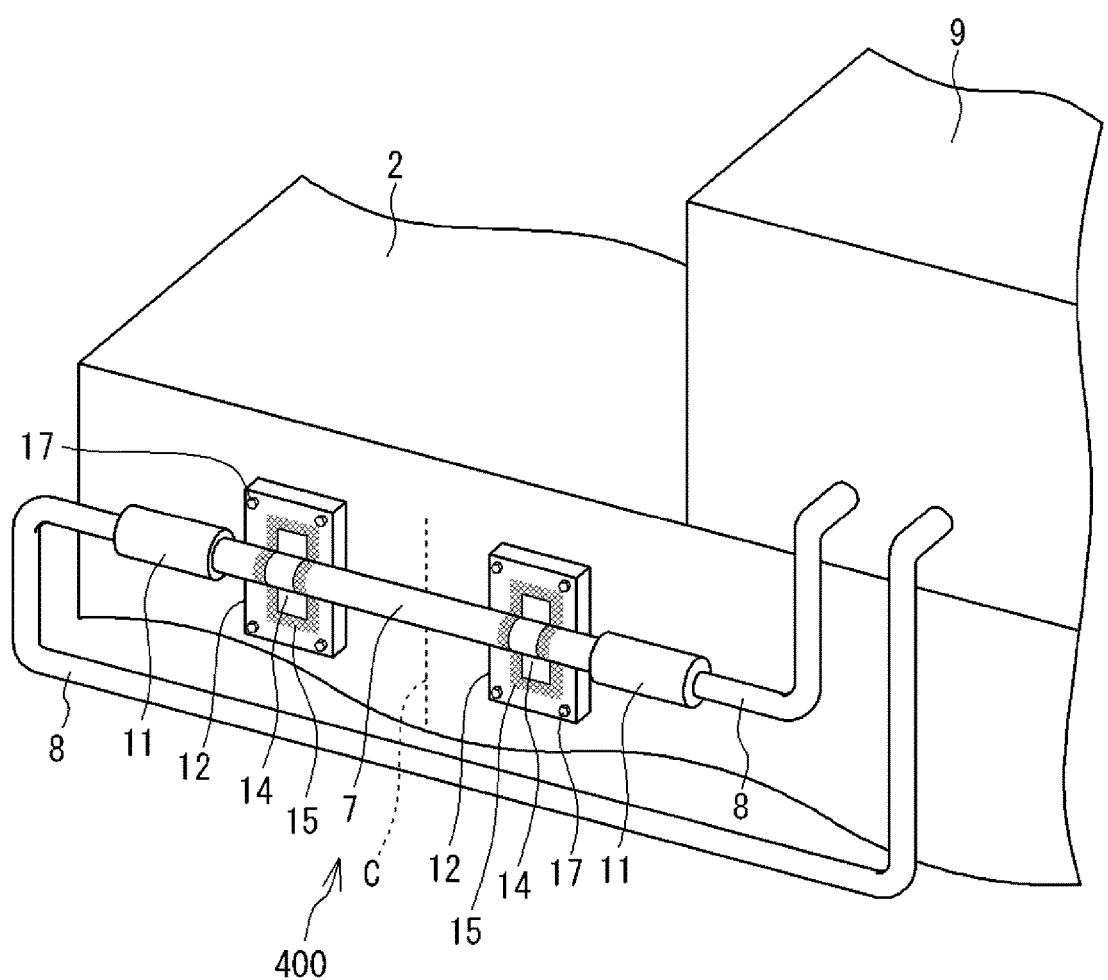
FIG. 11 is an enlarged perspective view around an MI cable which is a component of a crack detection device according to a fourth embodiment.

FIG. 11 is an enlarged perspective view around an MI cable 7 which is a component of a crack detection device 400 according to a fourth embodiment. The fourth embodiment is different from the third embodiment shown in FIG. 10 in that the metal pads 12 are fastened to the bogie frame 2 not by welding but by using bolts 17 at four corners. The other components of the fourth embodiment are identical to those of the third embodiment.

Also in this case, it is possible to quickly detect that a crack occurs in the bogie frame 2, as in the third embodiment.

Fifth Embodiment

Figure 12:
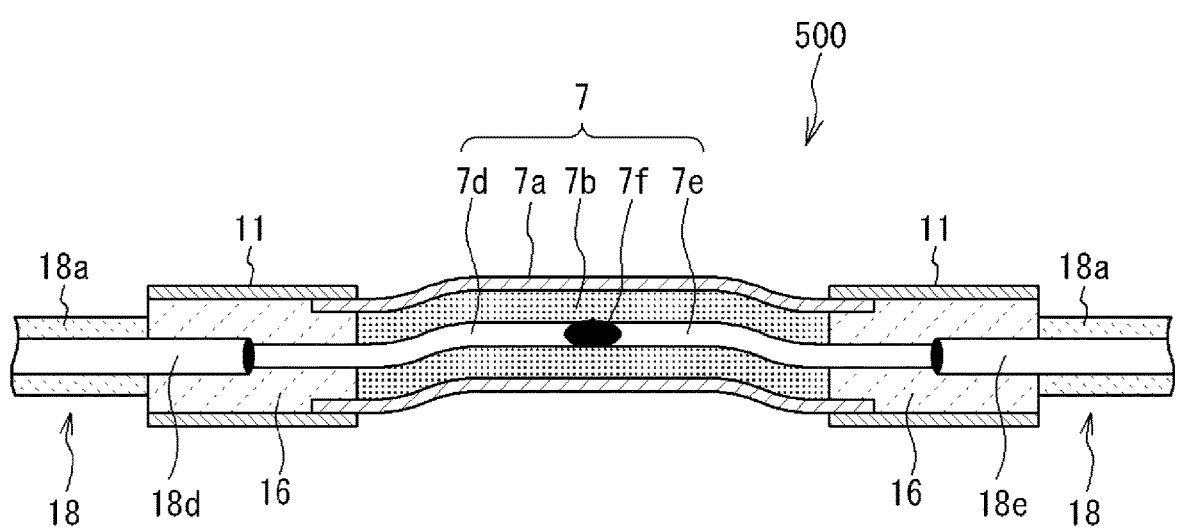
FIG. 12 is a horizontal cross-sectional view showing an MI cable, which is a component of a crack detection device according to a fifth embodiment, and the vicinity of both ends thereof.

FIG. 12 is a horizontal cross-sectional view (a cross-sectional view corresponding to FIG. 4 of the first embodiment) showing an MI cable 7, which is a component of a crack detection device 500 according to a fifth embodiment, and the vicinity of the both ends thereof. In this embodiment, a sheathed thermocouple is used as the MI cable 7. The MI cable 7 includes: an outer metal sheath 7a; a mineral insulating powder 7b firmly packed in the metal sheath 7a at high density; a positive-side wire 7d and a negative-side wire 7e of a thermocouple wire (conductive wire); and a temperature measurement portion 7f as a junction point of the two wires.

The positive-side wire 7d and the negative-side wire 7e are linearly disposed, and contact parts at the tips thereof are joined by welding to form the temperature measurement portion 7f. Moreover, the external cable 18 includes: a positive-side core wire 18d, of a compensating lead wire for the thermocouple, connected to the positive-side wire 7d, and an insulating coating 18a that covers the core wire 18d; and a negative-side core wire 18e, of the compensating lead wire for the thermocouple, connected to the negative-side wire 7e, and an insulating coating 18a that covers the core wire 18e. Each metal sleeve 11 is filled with a sealant 16 of an insulating material (e.g., glass). A portion in which the thermocouple positive-side wire 7d is connected to the positive-side core wire 18d of the compensating lead wire, and a portion in which the thermocouple negative-side wire 7e is connected to the negative-side core wire 18e of the compensating lead wire, are fixed and protected so as not to be broken, by the respective sealants 16.

Figure 13:
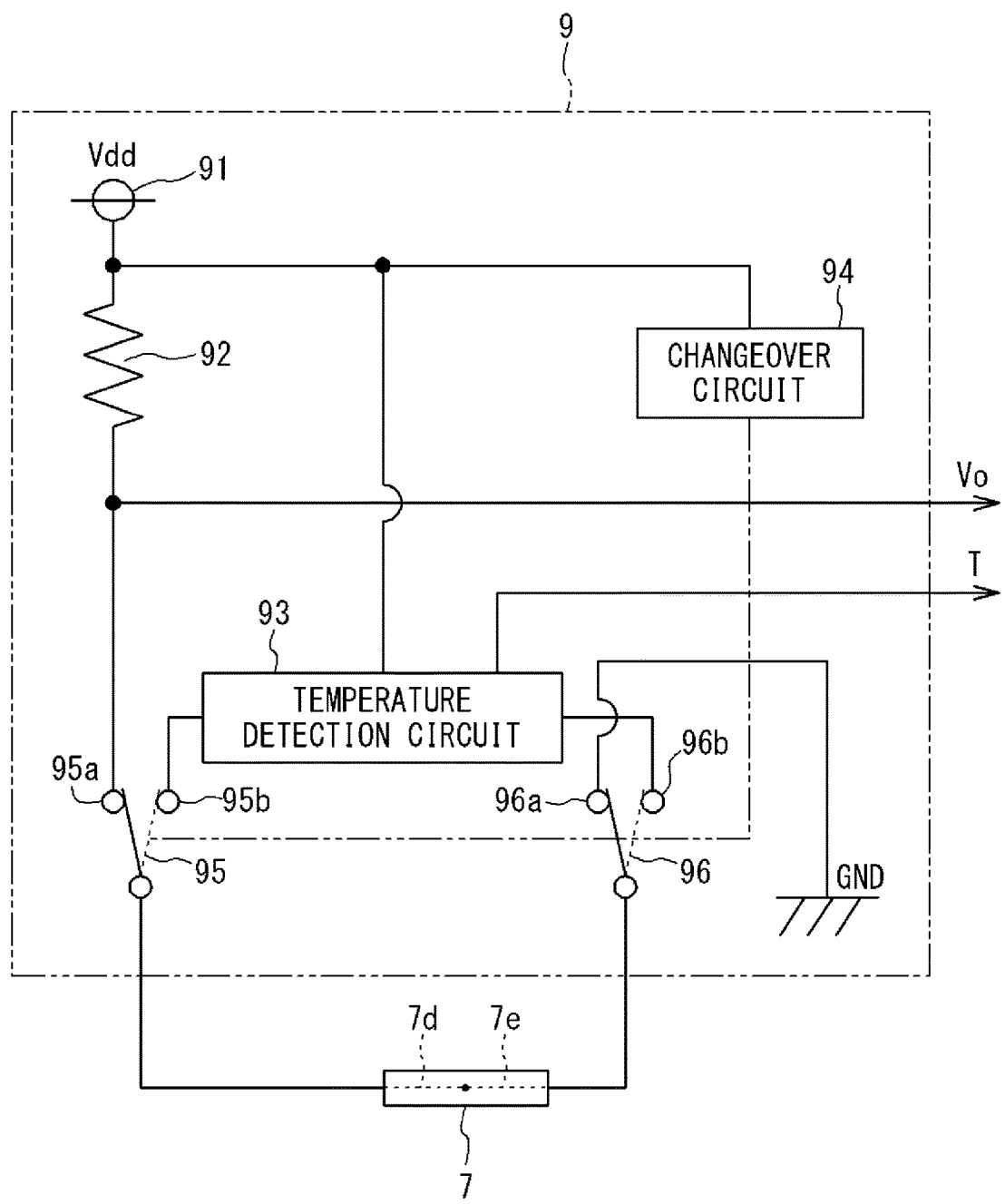
FIG. 13 shows an example of an internal circuit of the detection device according to the fifth embodiment.

FIG. 13 shows an example of an internal circuit of the detection device 9 according to the fifth embodiment. In FIG. 13, one end of a resistor 92 for limiting a current is connected to a power supply circuit 91 for a DC voltage (Vdd) externally supplied into the detection device 9. The other end of the resistor 92 is connected to one end of the MI cable 7 via a switch 95 that is connected to a terminal 95a. The other end of the MI cable 7 is grounded (GND) in the detection device 9 via a switch 96 that is connected to a terminal 96a. A voltage at a connection point between the resistor 92 and the switch 95 is outputted as a signal voltage Vo. The switches 95, 96 may be contact relays or semiconductor switches.

The DC voltage (Vdd) is also supplied as a power supply voltage to a temperature detection circuit 93 and a changeover circuit 94. When the switch 95 and the switch 96 are respectively connected to a terminal 95b and a terminal 96b, the temperature detection circuit 93 can detect a temperature caused by thermoelectromotive force from the MI cable 7 that is a sheathed thermocouple, and can output a temperature measurement signal T. The changeover circuit 94 can periodically change the connections of the switches 95, 96 between the terminals 95a, 96a and the terminals 95b, 96b, respectively.

When the switches 95, 96 are respectively connected to the terminals 95a, 96a, the circuit according to the fifth embodiment is substantially similar to that of the first embodiment (FIG. 5). When the thermocouple wire (positive-side wire 7d, negative-side wire 7e) of the MI cable 7 is normally conductive, the signal voltage Vo is the ground voltage, i.e., 0[V]. When the thermocouple wire of the MI cable 7 is broken and becomes non-conductive, the signal voltage Vo is Vdd. Therefore, whether the thermocouple wire of the MI cable 7 is conductive or non-conductive can be known from the signal voltage Vo.

When the switches 95, 96 are respectively connected to the terminals 95b, 96b, the MI cable 7 measures the temperature at the temperature measurement portion 7f (FIG. 12), and the temperature detection circuit 93 outputs a temperature measurement signal T. The temperature of the assumed crack C (FIG. 2), which is a target of temperature measurement, may be increased because a stress is concentrated thereto. Therefore, in the circuit shown in FIG. 13, occurrence of a crack can be predicted in advance by detecting that the temperature of the assumed crack C and its vicinity is increased due to the stress concentration.

The changeover circuit 94 periodically changes the states of the switches 95, 96. Thus, temperature detection and crack (breakage) detection can be performed in a time division manner. Even when the switches 95, 96 are respectively connected to the terminals 95b, 96b, if a crack occurs and the thermocouple wire (at least one of the positive-side wire 7d and the negative-side wire 7e) is broken, no thermoelectromotive force is inputted to the temperature detection circuit 93. This state can also be detected as breakage (occurrence of a crack) by the temperature detection circuit 93.

Sixth Embodiment

Figure 14:
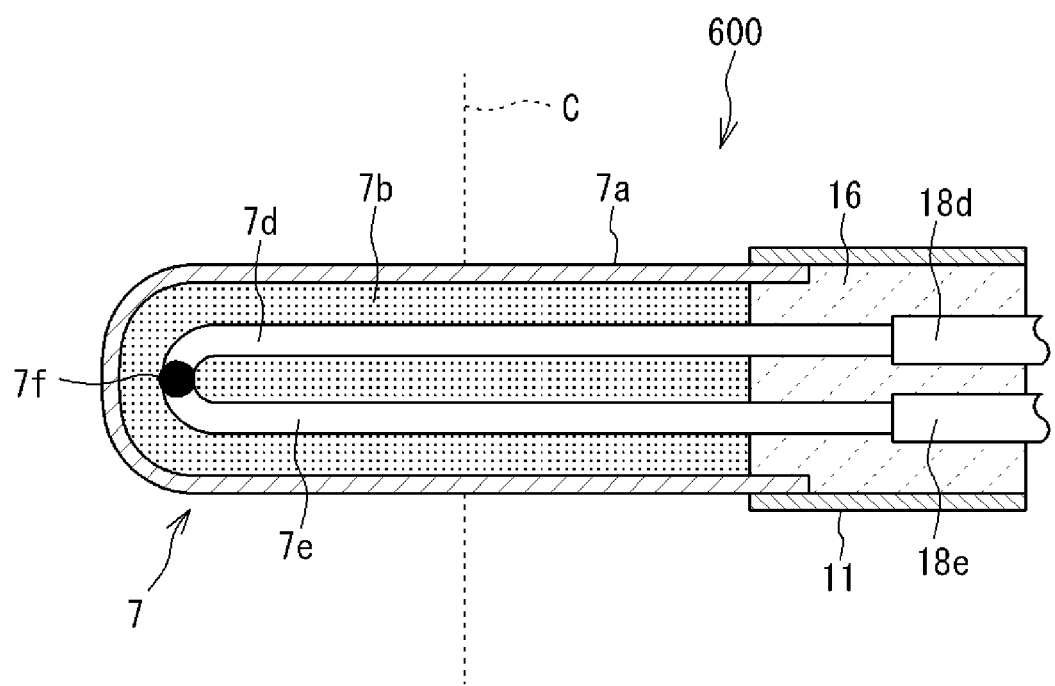
FIG. 14 is a horizontal or vertical cross-sectional view of an MI cable which is a component of a crack detection device according to a sixth embodiment.

FIG. 14 is a horizontal or vertical cross-sectional view of an MI cable 7 which is a component of a crack detection device 600 according to a sixth embodiment. In this embodiment, as the MI cable 7, a sheathed thermocouple is used in its original shape. That is, a thermocouple wire is a reciprocating wire composed of a positive-side wire 7d, and a negative-side wire 7e that returns back through a temperature measurement portion 7f at the tip of the positive-side wire 7d. The same components as those of the fifth embodiment (FIG. 12) are denoted by the same reference characters, and descriptions thereof are omitted. As for mounting of the MI cable 7 to the bogie frame 2, metal pads 12 may be used as shown in FIG. 7, FIG. 10, or FIG. 11, for example.

In this case, the MI cable 7 is mounted within the range of the length of the metal sheath 7a, preferably, near the center of the length of the metal sheath 7a, such that the MI cable 7 intersects the assumed crack C. Thus, if a crack occurs, the MI cable 7 is broken, and at least either thermocouple wire (the positive-side wire 7d or the negative-side wire 7e) is broken, thereby detecting occurrence of the crack. The metal sheath 7a as a thermocouple is actually longer than that imaged from the drawings. Utilizing the length of the thermocouple, the thermocouple can be used as it is as the MI cable 7 for detecting a crack.

Seventh Embodiment

Figure 15:
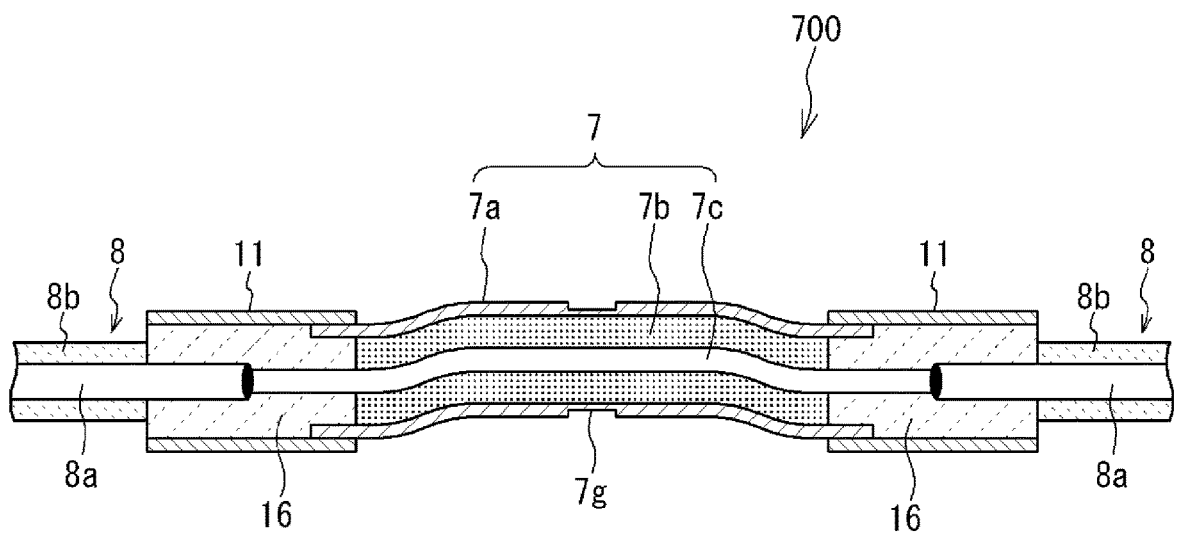
FIG. 15 is a horizontal cross-sectional view showing an MI cable, which is a component of a crack detection device according to a seventh embodiment, and the vicinity of both ends thereof.

FIG. 15 is a horizontal cross-sectional view (cross-sectional view corresponding to FIG. 4 of the first embodiment) showing an MI cable 7, which is a component of a crack detection device 700 according to a seventh embodiment, and the vicinity of both ends thereof. This seventh embodiment is different from the first embodiment (FIG. 4) in that a peripheral groove 7g is formed in a middle part of the metal sheath 7a. Since the thickness of the metal sheath 7a is reduced at the part having the peripheral groove 7g, if a crack occurs, breakage occurs more reliably from the peripheral groove 7g. Therefore, it is possible to break the conductive wire 7c and detect a crack more reliably.

The structure of the MI cable 7 provided with the peripheral groove 7g is also applicable to the first to sixth embodiments.

Others

In the aforementioned embodiments, one MI cable 7 is provided. However, a plurality of MI cables 7 may be provided in series so that a crack can be detected when any MI cable 7 is broken.

For example, three (this numerical value is one example) MI cables 7 may be connected in series and meanderingly arranged so that each MI cable 7 intersects the assumed crack C. In this case, it is possible to detect a crack over a wide range in the vertical direction of the assumed crack C.

Moreover, for example, three MI cables 7 may be connected in series and arranged so that the respective MI cables 7 intersect three assumed cracks. In this case, even when there are a plurality of assumed cracks, it is possible to detect a crack that occurs at any assumed crack.

At least parts of the aforementioned embodiments may be combined with each other as desired.

In the aforementioned embodiments, an object to be subjected to crack detection is a railcar bogie. However, the disclosed technology for crack detection is applicable to not only a bogie but also various structures in which cracks are likely to occur due to stress concentration.

<<Summary of disclosure>>

The above disclosure can be generally expressed as follows.

(1) Disclosed is a crack detection device 100 for detecting a crack that occurs in a structure. The crack detection device 100 includes an MI cable 7, a joint portion 10 (15), and a detection device 9. The MI cable 7 includes a metal sheath 7a, a mineral insulating powder 7b packed in the metal sheath 7a, and a conductive wire 7c (or thermocouple wire) insulated from the metal sheath 7a by the mineral insulating powder 7b. The MI cable 7 is disposed along the structure so as to intersect an assumed crack C in a part of the structure where occurrence of a crack is assumed. The joint portion 10 (15) is made of a metal that forms a joint when solidified from the melting state, and joins the MI cable 7 to the structure or a member (e.g., a metal pad 12) fixed to the structure. The detection device 9 is connected to both ends of a conductive wire 8a of an external cable 8, and detects electrical characteristics of the conductive wire 7c. The joint portion 10 (15) is present on one side and the other side with respect to the assumed crack C in the direction intersecting the assumed crack C.

In the above crack detection device 100, when a crack actually occurs in the structure, the MI cable 7 metal-joined to the structure is also broken, and the conductive wire 7c (or thermocouple wire) is broken. The detection device 9 detects that the conductive wire 7c has been broken and is no more conductive, thereby detecting occurrence of the crack. According to the crack detection device 100, it is possible to inhibit, over a long period of time, the crack detection function from deteriorating, and detect occurrence of a crack more reliably.

For example, the joint portion 10 (15) may be fixed to the structure in at least one spot on each of the one side and the other side in the direction intersecting the assumed crack C.

In this case, the MI cable 7, which is fixed to the structure on the one side and the other side in the direction intersecting the assumed crack C, is broken with high reliability due to occurrence of a crack. As for the manner of fixing by use of the joint portion 10 (15), the joint portion 10 (15) may be present in spots on the both sides in the direction intersecting the assumed crack C, or may be present continuously in the direction intersecting the assumed crack C.

(2) In the crack detection device 100 of the above (1), the member may include a pair of metal pads 12, the metal pads 12 may be respectively fixed to the structure on the one side and the other side in the direction intersecting the assumed crack C, and the joint portion 10 (15) may be disposed on each of the pair of metal pads 12.

The adopted MI cable 7 has a small diameter (e.g., about 3 mm). Therefore, when the MI cable 7 is directly mounted to the structure by welding, for example, attention should be paid so that the MI cable 7 is not damaged by heat. However, using the metal pads 12 allows a two-step mounting process including:

(a) forming the MI cable 7 to the metal pads 12 in advance by laser welding or brazing, for example; and (b) welding the metal pads 12 to the structure by arc welding, for example. The step (b) requires less attention as compared to the step (a). Therefore, this mounting process is preferable if the welding in the step (b) is left to the end user.

(3) In the crack detection device 100 according to the above (1) or (2), the conductive wire 7c may be a thermocouple wire.

As the MI cable 7, a sheathed thermocouple having a similar structure can be used. In this case, a thermocouple wire (7d, 7e) is used instead of the conductive wire. The thermocouple wire may be composed of two wires, i.e., a positive-side wire 7d, and a negative-side wire 7e that returns back via a temperature measurement portion 7f at the tip of the positive-side wire 7d. In this case, utilizing the length of the thermocouple, the thermocouple can be used as it is as the MI cable 7.

(4) In the crack detection device 100 according to any one of the above (1) to (3), the MI cable 7 may have a portion having a thin thickness (e.g., a peripheral groove 7g) at an outer peripheral surface of the metal sheath 7a.

In this case, when a crack occurs, the MI cable 7 can be broken more reliably, whereby the conductive wire 7c can be broken.

<<Additional note>>

While the embodiments have been described above, it would be understood that various modifications may be made to the embodiments and the details without departing from the spirit and scope of the claims.

REFERENCE SIGNS LIST 1 bogie
2 bogie frame
2a spring seat
2b main body
2c weld bead
3 support arm
4 axle
5 wheel
6 axle spring
7 MI cable
7a metal sheath
7b mineral insulating powder
7c conductive wire
7d positive-side wire (thermocouple wire)
7e negative-side wire (thermocouple wire)
7f temperature measurement portion
7g peripheral groove
8 external cable
8a conductive wire
8b insulating coating
9 detection device
10 joint portion
11 metal sleeve
12 metal pad
13 welded portion
14 pressing metal fitting
15 joint portion
16 sealant
17 bolt
18 external cable
18a insulating coating
18d positive-side core wire (compensating lead wire)
18e negative-side core wire (compensating lead wire)
91 power supply circuit
92 resistor
93 temperature detection circuit
94 changeover circuit
95, 96 switch
95a, 95b, 96a, 96b terminal
100, 200, 300, 400, 500, 600, 700 crack detection device
C assumed crack
Ck crack
P crack-assumed portion

The invention claimed is:

1. A crack detection device configured to detect a crack that occurs in a structure, comprising:
    an MI cable including a metal sheath and a conductive wire accommodated in the metal sheath via a mineral insulating powder, the MI cable being disposed along the structure so as to intersect an assumed crack in a part of the structure where occurrence of a crack is assumed;
    a joint portion made of a metal that forms a joint when solidified from a melting state, the joint portion joining the MI cable to a member fixed to the structure; and
    a detection device electrically connected to both ends of the conductive wire, and configured to detect electrical characteristics of the conductive wire, wherein:
    the joint portion is present on one side and an other side with respect to the assumed crack in a direction intersecting the assumed crack,
    the member includes a pair of metal pads, and the pair of metal pads are respectively fixed to the structure on the one side and the other side in the direction intersecting the assumed crack, and
    the joint portion is disposed on each of the pair of metal pads.

2. The crack detection device according to claim 1, wherein the conductive wire is a thermocouple wire.

3. The crack detection device according to claim 1, wherein the MI cable has a portion having a thin thickness at an outer peripheral surface of the metal sheath.

4. The crack detection device according to claim 2, wherein the MI cable has a portion having a thin thickness at an outer peripheral surface of the metal sheath.

* * * * *